United States Patent
Pi et al.

(10) Patent No.: US 12,093,804 B2
(45) Date of Patent: Sep. 17, 2024

(54) SATELLITE ANOMALY DETECTION METHOD AND SYSTEM FOR ADVERSARIAL NETWORK AUTO-ENCODER

(71) Applicant: NANJING UNIVERSITY OF AERONAUTICS AND ASTRONAUTICS, Jiangsu (CN)

(72) Inventors: Dechang Pi, Jiangsu (CN); Junfu Chen, Jiangsu (CN); Zhiyuan Wu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 910 days.

(21) Appl. No.: 17/255,267

(22) PCT Filed: Feb. 18, 2020

(86) PCT No.: PCT/CN2020/075658
§ 371 (c)(1),
(2) Date: Dec. 22, 2020

(87) PCT Pub. No.: WO2020/181962
PCT Pub. Date: Sep. 17, 2020

(65) Prior Publication Data
US 2021/0174171 A1    Jun. 10, 2021

(30) Foreign Application Priority Data
Mar. 13, 2019    (CN) .................. 201910195659.X

(51) Int. Cl.
*G06N 3/08*      (2023.01)
*G06N 3/04*      (2023.01)
(Continued)

(52) U.S. Cl.
CPC ............. *G06N 3/045* (2023.01); *G06N 3/084* (2013.01); *G06N 3/088* (2013.01); *H04B 7/18582* (2013.01)

(58) Field of Classification Search
CPC ........ G06N 3/045; G06N 3/084; G06N 3/088; H04B 7/18582
See application file for complete search history.

(56) References Cited

U.S. PATENT DOCUMENTS

2012/0112925 A1*   5/2012   You ................... H04B 7/18519
                                                          340/870.05
2019/0378010 A1*   12/2019   Morris ................. G06F 16/288

FOREIGN PATENT DOCUMENTS

CN      107123151 A      9/2017
CN      107358195 A     11/2017
(Continued)

OTHER PUBLICATIONS

Kiran, BR. et al., "An overview of deep learning based methods for unsupervised and semi-supervised anomaly detection in videos" Journal of Imaging, vol. 4, No. (2), Feb. 7, 2018.

*Primary Examiner* — Mahelet Shiberou
(74) *Attorney, Agent, or Firm* — Tarolli, Sundheim, Covell & Tummino LLP

(57) ABSTRACT

The present disclosure provides a satellite anomaly detection method and system for an adversarial network auto-encoder. The method includes: obtaining a variational auto-encoder and a generative adversarial network; adding the generative adversarial network to the variational auto-encoder, and determining an optimized variational auto-encoder; obtaining to-be-detected satellite telemetry data; and determining a current operating status of a satellite based on the to-be-detected satellite telemetry data by using the optimized variational auto-encoder, where the current operating status includes a normal operating state or an abnormal operating
(Continued)

state. The satellite anomaly detection method and system for an adversarial network according to the present disclosure solve the low accuracy problem of automatic satellite anomaly detection in the prior art.

3 Claims, 3 Drawing Sheets

(51) Int. Cl.
*G06N 3/045* (2023.01)
*G06N 3/084* (2023.01)
*G06N 3/088* (2023.01)
*H04B 7/185* (2006.01)

(56) References Cited

FOREIGN PATENT DOCUMENTS

| | | |
|---|---|---|
| CN | 107991876 A | 5/2018 |
| CN | 109447263 A | 3/2019 |
| CN | 109948117 A | 6/2019 |

* cited by examiner

SATELLITE ANOMALY DETECTION METHOD AND SYSTEM FOR ADVERSARIAL NETWORK AUTO-ENCODER

RELATED APPLICATIONS

The present invention is a U.S. National Stage under 35 USC 371 patent application, claiming priority to Ser. No. PCT/CN2020/075658, filed on 18 Feb. 2020; which claims priority to Chinese Patent Application No. 201910195659.X, filed on 13 Mar. 2019 and entitled "SATELLITE ANOMALY DETECTION METHOD AND SYSTEM FOR ADVERSARIAL NETWORK AUTO-ENCODER", the entirety of both of which are incorporated herein by reference.

TECHNICAL FIELD

The present disclosure relates to the field of engineering application and information science, and in particular, to a satellite anomaly detection method and system for an adversarial network auto-encoder.

BACKGROUND

Satellites are always in the harsh outer space environment with solar radiation and other interferences, and therefore unpredictable abnormalities or faults may occur during the orbital operation. Taking measures in advance to detect these unforeseen abnormalities or failures is critical to ensure long-term stable operation of the satellites. Therefore, telemetry data anomaly detection plays an important role in satellite troubleshooting and real-time health detection. Considering the complex design structure of the satellite and the harsh working environment, it is impossible to perform anomaly detection directly in the outer space environment. At present, multiple sensors are installed on various components of the satellite to directly collect in-orbit operation data of each component of the satellite and transmit the in-orbit operation data to the ground telemetry centre. Then, the satellite time series telemetry data is analyzed to implement the satellite anomaly detection.

The National Aeronautics and Space Administration (NASA) has carried out a lot of work in satellite anomaly detection and fault diagnosis. NASA proposed a satellite anomaly detection and fault diagnosis method based on simple status monitoring in the 1960s, an algorithm-based satellite anomaly detection and fault diagnosis method in the 1970s, a knowledge-based satellite anomaly detection and fault diagnosis method in the 1980s, and a satellite anomaly detection and fault diagnosis method based on agent and network in the 1990s. Since the 21st century, to improve the stability and safety of satellites in orbit, NASA has proposed a satellite integrated health management technology. This technology integrates the performance evaluation, anomaly detection, fault prediction and other modules of satellite subsystems, as well as their corresponding processing measures and logistical support arrangements into a comprehensive satellite health management system.

Since the 1980s, data mining has shown its brilliance in the field of statistical analysis. Statistics-based hypothesis testing first emerged in the field of anomaly detection, which determines whether a data sample is abnormal through the statistics of small probability events. Later, Grubbs et al. proposed to calculate the Grubbs test statistics for each data based on the t-distribution of the data set to meet the standard. If the statistical value of the data exceeds a threshold, it is considered to be abnormal data. Knorr et al. proposed the concept of distance in the field of anomaly detection, and calculated the distance between different data points as the basis for judging whether an abnormality occurred. However, when the data points are from data sets with different density distributions, this method has a poor anomaly detection effect. In order to solve this problem, Breunig et al. added density calculation to the anomaly detection algorithm, which avoids the problem of poor detection results of datasets with uneven density distribution. However, the algorithm is too complex to process massive data. Dawei Pan et al. proposed an anomaly detection algorithm based on kernel principal component analysis (KPCA) and association rules. KPCA is used to construct feature matrices, and a closed mode is used to mine association rules between telemetry attributes in time series to identify anomalies. However, this method is not effective for high-dimensional telemetry parameters and cannot solve the problem of high-dimensional data. Qin et al. designed an algorithm that distinguishes the range of periodic data from monotonicity, which warns about abnormalities in advance by detecting the lower limit of telemetry data. This method has a higher detection accuracy for telemetry data with strong periodicity. However, for telemetry data with insignificant or no periodicity, this method cannot accurately determine the frequency change, and therefore cannot detect anomalies. Wang et al. firstly analyzed the satellite in-orbit illumination period and shadow period for the fault detection of the TX-1 star, then used the local linear mapping algorithm to reduce the dimension and extract features, mapped the high-dimensional data space to the low-dimensional feature space, and finally calculated statistics $T^2$ and SPE to detect faults. However, automatic detection cannot be implemented, and the accuracy of automatic satellite anomaly detection cannot be guaranteed due to the high anomaly detection error.

SUMMARY

The present disclosure aims to provide a satellite anomaly detection method and system for an adversarial network auto-encoder, to solve the low accuracy problem of automatic satellite anomaly detection in the prior art.

To achieve the above objective, the present disclosure provides the following technical solutions:

A satellite anomaly detection method for an adversarial network auto-encoder includes:

obtaining a variational auto-encoder and a generative adversarial network, where the variational auto-encoder takes satellite telemetry data as input and reconstructed data as output; the variational auto-encoder includes an encoder and a decoder; and the generative adversarial network includes a generator and a discriminator;

adding the generative adversarial network to the variational auto-encoder, and determining an optimized variational auto-encoder, where the optimized variational auto-encoder includes an optimized encoder and the decoder; the optimized encoder is used to encode to-be-detected satellite telemetry data into a hidden variable; and the decoder is used to decode the hidden variable into the reconstructed data;

obtaining the to-be-detected satellite telemetry data; and determining a current operating status of a satellite based on the to-be-detected satellite telemetry data by using the optimized variational auto-encoder, where the current operating status includes a normal operating state or an abnormal operating state.

Optionally, the determining a current operating status of a satellite based on the to-be-detected satellite telemetry data by using the optimized variational auto-encoder specifically includes:

determining the reconstructed data based on the to-be-detected satellite telemetry data by using the optimized variational auto-encoder;

determining a reconstruction error based on the to-be-detected satellite telemetry data, the reconstructed data, and a Mahalanobis distance;

obtaining an error threshold;

determining whether the reconstruction error is less than the error threshold;

if the reconstruction error is less than the error threshold, determining that the current operating status of the satellite is the normal operating state; and if the reconstruction error is not less than the error threshold, determining that the current operating status of the satellite is the abnormal operating state.

Optionally, the obtaining an error threshold specifically includes:

obtaining satellite telemetry sample data in a satellite period from a database; and analyzing the satellite telemetry sample data based on the satellite telemetry sample data by using a wavelet variance, to determine an error threshold at each moment.

Optionally, the adding the generative adversarial network to the variational auto-encoder, and determining an optimized variational auto-encoder specifically includes:

determining the generator of the generative adversarial network based on the encoder in the variational auto-encoder, where the generator is used to optimize the encoder in the variational auto-encoder and determine the optimized encoder;

determining the discriminator of the generative adversarial network based on a bilateral long short-term memory network;

discriminating, based on the discriminator, the hidden variable encoded by the optimized encoder, to determine an optimized hidden variable; and determining the optimized variational auto-encoder based on the optimized hidden variable and the decoder in the variational auto-encoder.

A satellite anomaly detection system for an adversarial network auto-encoder, including:

a first obtaining module, configured to obtain a variational auto-encoder and a generative adversarial network, where the variational auto-encoder takes satellite telemetry data as input and reconstructed data as output; the variational auto-encoder includes an encoder and a decoder; and the generative adversarial network includes a generator and a discriminator;

an optimized variational auto-encoder determining module, configured to add the generative adversarial network to the variational auto-encoder, and determine an optimized variational auto-encoder, where the optimized variational auto-encoder includes an optimized encoder and the decoder; the optimized encoder is used to encode to-be-detected satellite telemetry data into a hidden variable; and the decoder is used to decode the hidden variable into the reconstructed data;

a second obtaining module, configured to obtain the to-be-detected satellite telemetry data; and a satellite current operating status determining module, configured to determine a current operating status of the satellite based on the to-be-detected satellite telemetry data by using the optimized variational auto-encoder, where the current operating status includes a normal operating state or an abnormal operating state.

Optionally, the satellite current operating status determining module specifically includes:

a reconstructed data determining unit, configured to determine the reconstructed data based on the to-be-detected satellite telemetry data by using the optimized variational auto-encoder;

a reconstruction error determining unit, configured to determine a reconstruction error based on the to-be-detected satellite telemetry data, the reconstructed data, and a Mahalanobis distance;

an error threshold obtaining unit, configured to obtain an error threshold;

a determining unit, configured to determine whether the reconstruction error is less than the error threshold;

a normal operating state determining unit, configured to determine that a current operating status of the satellite is the normal operating state if the reconstruction error is less than the error threshold; and an abnormal operating state determining unit, configured to determine that the current operating status of the satellite is the abnormal operating state if the reconstruction error is not less than the error threshold.

Optionally, the error threshold obtaining unit specifically includes:

a satellite telemetry sample data obtaining subunit, configured to obtain satellite telemetry sample data in a satellite period from a database; and an error threshold determining subunit, configured to analyze the satellite telemetry sample data based on the satellite telemetry sample data by using a wavelet variance, to determine an error threshold at each moment.

Optionally, the optimized variational auto-encoder determining module specifically includes:

a generator determining unit, configured to determine the generator of the generative adversarial network based on the encoder in the variational auto-encoder, where the generator is used to optimize the encoder in the variational auto-encoder and determine the optimized encoder;

a discriminator determining unit, configured to determine the discriminator of the generative adversarial network based on a bilateral long short-term memory network; and an optimized variational auto-encoder determining unit, configured to determine the optimized variational auto-encoder based on the optimized hidden variable and the decoder in the variational auto-encoder.

Compared with the prior art, the present disclosure has the following advantages: The present disclosure provides a satellite anomaly detection method and system for an adversarial network auto-encoder, in which an adversarial network is introduced into a variational encoder to obtain an optimized variational encoder, and detection of satellite telemetry data is implemented through the optimized variational encoder. The present disclosure is purely data-driven, without requiring expert experience, and can be applied to a variety of occasions. With a combination of the respective advantages of the variational auto-encoder and the generative adversarial network, anomaly data can be quickly and accurately detected, that is, the abnormal state of the satellite can be detected. This solves the prior-art problems of the incapability to achieve automatic detection and the high detection error, and ensures the accuracy of automatic satellite anomaly detection.

BRIEF DESCRIPTION OF DRAWINGS

The present disclosure will be explained in detail with reference to the accompanying drawings.

DETAILED DESCRIPTION

The basic idea of the present disclosure is to use an auto-encoder to reconstruct data, and determine anomalies based on reconstruction errors. An adversarial network is introduced, and the advantages of both the variational auto-encoder and the generative adversarial network are combined, obtaining a more accurate reconstruction model, reducing the error of the reconstruction model, and reducing the error of anomaly detection. For anomaly judgment, a Mahalanobis distance is used to calculate the reconstruction error, which considers the sensor redundancy without relying on expert experience. Periodic analysis is performed on data, further improving the accuracy of the reconstructed data.

Based on the satellite anomaly detection method and system for an adversarial network auto-encoder, the present disclosure is further described in detail with reference to specific embodiments.

Figure 1:
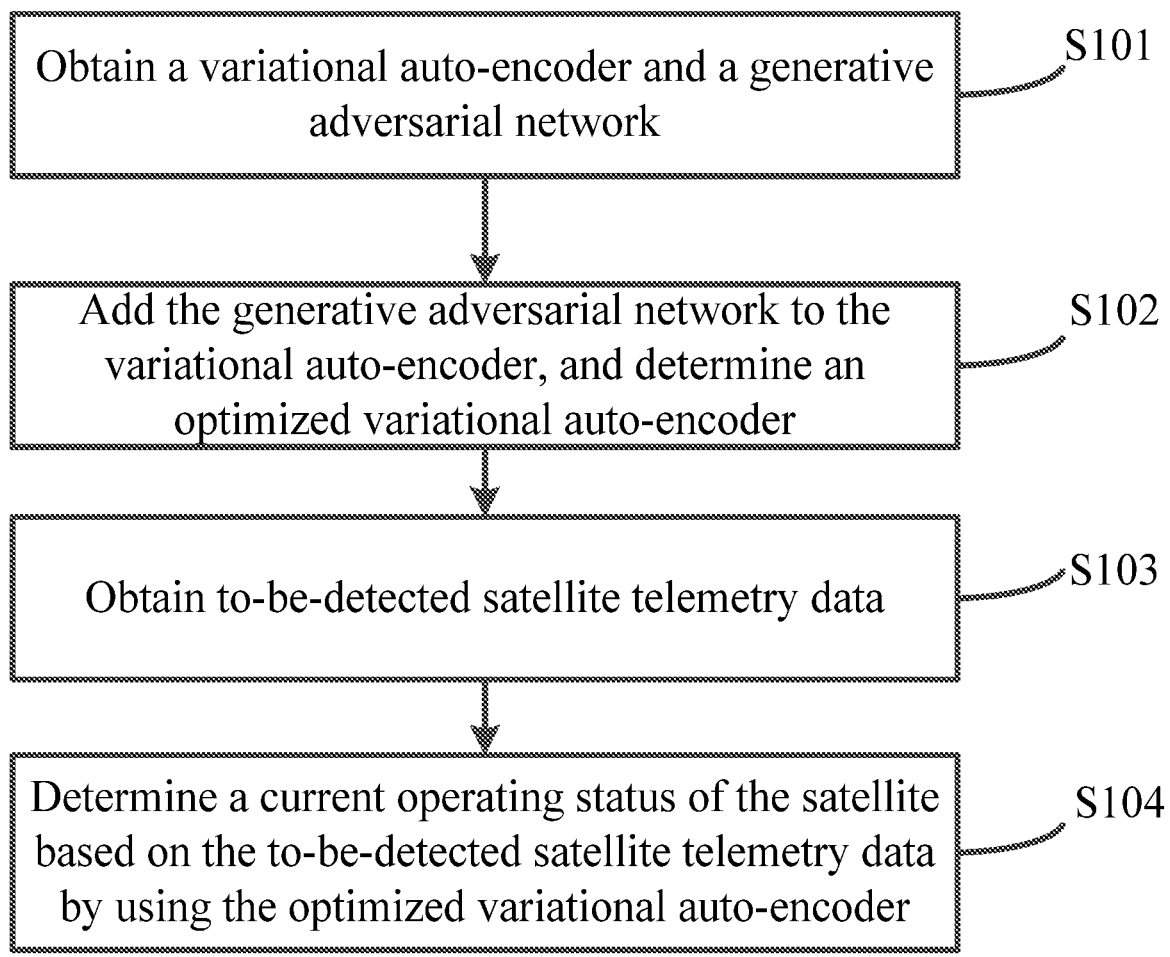
FIG. 1 is a schematic flowchart of a satellite anomaly detection method for an adversarial network auto-encoder according to the present disclosure.

FIG. 1 is a schematic flowchart of a satellite anomaly detection method for an adversarial network auto-encoder according to the present disclosure. As shown in FIG. 1, the satellite anomaly detection method for an adversarial network auto-encoder according to the present disclosure includes the following steps.

S101. Obtain a variational auto-encoder and a generative adversarial network, where the variational auto-encoder takes satellite telemetry data as input and reconstructed data as output; the variational auto-encoder includes an encoder and a decoder; and the generative adversarial network includes a generator and a discriminator.

A loss function of the variational auto-encoder is $L_{VAE}=L_R+L_{KL}^{p-q}=-E_{q(z|x)}[\log p(x|z)]+D_{KL}(q(z|x)\|p(z))$, where $L_{VEA}$ is an error of the variational auto-encoder, $L_R$ is a reconstruction error of a sample, and $L_{KL}^{p-q}$ is a KL divergence of a posterior probability and a true posterior probability.

Figure 2:
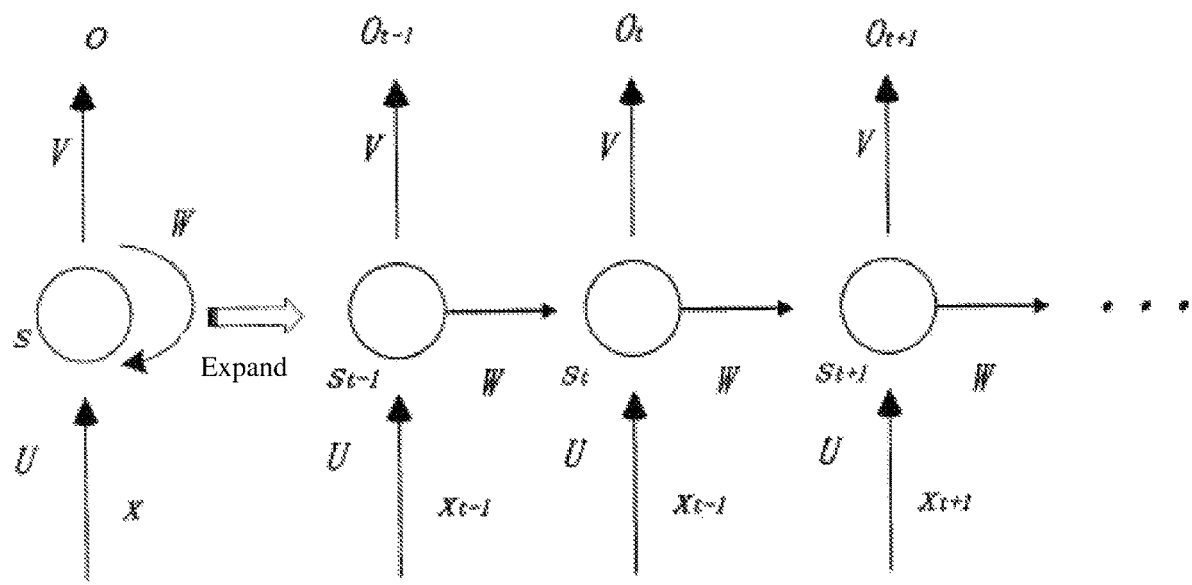
FIG. 2 is a schematic structural diagram of a recurrent neural network according to the present disclosure.

FIG. 2 is a schematic structural diagram of a unidirectional recurrent neural network. The unidirectional recurrent neural network can only process data in one direction. In order to process data in two directions, the present disclosure uses a bilateral long short-term memory network as a discriminator in the generative adversarial network.

A formula $\vec{h}_1=H(W_{x\vec{h}_t}x_t+W_{\vec{h}\vec{h}}\vec{h}_{t-1}+b_{\vec{h}})$ is used to determine the update of recurrent neural network layers from front to back.

A formula $\bar{h}_1=H(W_{x\bar{h}_t}x_t W_{\bar{h}\bar{h}}\bar{h}_{t-1}+b_{\bar{h}})$ is used to determine the update of recurrent neural network layers from back to front.

A formula $y_t=W_{\bar{h},y}\vec{h}_t+W_{\bar{h},y}\bar{h}+b_y$ is used to determine the superimposition of two recurrent neural network layers and input a hidden layer.

A formula $$\min_{GEN}\max_{DIS} O(DIS, GEN) = E_{x \sim P_{data}}[\log DIS(x)] + E_{x \sim P_z}[\log(1 - DIS(GEN(z)))]$$

is used to determine an objective function of the generative adversarial network.

$P_{data}$ and $P_z$ are the distribution of real data and generated data, DIS is a generator, GEN is the discriminator, x is the input data, and z is a hidden variable generated by the encoder.

During training of the discriminator, it is desirable that a discriminant value of the real data can be close to 1 and a discriminant value of the generated data can be close to 0. During training of the generator, it is desirable to generate data that can spoof the discriminator so that the discriminant value of the generated data is close to 1. At the beginning of the generator training, the distribution of the generated data and the real data is very different, and a discriminant result of a discriminator model is in the up and down swing state; then, a procedure of fixing the generator to train the discriminator and fixing the discriminator to train the generator is repeated until the discriminator cannot discriminate between the true or false of the generated data. The purpose of the generator is to constantly train a generation model so that $P_z$ gets closer to $P_{data}$, and construct a discriminator to distinguish between the generated data and the real data.

S102. Add the generative adversarial network to the variational auto-encoder, and determine an optimized variational auto-encoder, where the optimized variational auto-encoder includes an optimized encoder and the decoder; the optimized encoder is used to encode to-be-detected satellite telemetry data into a hidden variable; and the decoder is used to decode the hidden variable into the reconstructed data.

The generator of the generative adversarial network is determined based on the encoder in the variational auto-encoder; and the generator is used to optimize the encoder in the variational auto-encoder and determine the optimized encoder.

The discriminator of the generative adversarial network is determined based on the bilateral long short-term memory network.

The hidden variable encoded by the optimized encoder is discriminated based on the discriminator, to determine an optimized hidden variable.

The optimized variational auto-encoder is determined based "on the optimized hidden variable and the decoder in the variational auto-encoder.

S103: Obtain the to-be-detected satellite telemetry data. The satellite telemetry data changes as the satellite periodically changes.

S104: Determine a current operating status of the satellite based on the to-be-detected satellite telemetry data by using the optimized variational auto-encoder, where the current operating status includes a normal operating state or an abnormal operating state.

The optimized variational auto-encoder is used to determine the reconstructed data based on the to-be-detected satellite telemetry data.

The Mahalanobis distance is used to determine the reconstruction error based on the to-be-detected satellite telemetry data and the reconstructed data.

A formula $Dist=\sqrt{(x-\mu)^T\Sigma^{-1}(x-\mu)}$ is used to determine the reconstruction error. x is the to-be-detected satellite telemetry data, $\mu$ is an average value of the satellite telemetry data, and $\Sigma^{-1}$ represents an inverse matrix of a covariance matrix of a satellite telemetry data space.

In order to further improve the accuracy of the reconstruction error, a reconstruction error score is determined on a basis of the reconstruction error determined based on the Mahalanobis distance.

That is, a formula $$RE_{score}(i) = \sqrt{(x(i) - \overline{R(i)}) \frac{1}{X} \sum (x(i) - \overline{R(i)})^T}$$

is used to determine the reconstruction error score. $x(i)$ is the i-th piece of satellite telemetry data, and $\overline{R(i)}$ is the i-th piece of satellite telemetry data reconstructed by the auto-encoder.

$RE_{score}(i)$ is a relatively robust reconstruction error metric in high-dimensional space, which can reflect a change trend of the reconstruction error of the satellite telemetry data. In order to monitor this trend and detect abnormal changes, an error threshold needs to be set, that is, the accuracy of the reconstruction error is ensured by setting the error threshold.

The error threshold is obtained.

It is determined whether the reconstruction error is less than the error threshold.

If the reconstruction error is less than the error threshold, it is determined that the current operating status of the satellite is the normal operating state.

If the reconstruction error is not less than the error threshold, it is determined that the current operating status of the satellite is the abnormal operating state.

The satellite telemetry data reflects the current state of the satellite in orbit. Due to the periodicity of the satellite operation, the satellite telemetry data also periodically changes with the satellite period. Accurately analyzing the change period of the satellite telemetry data is of great significance to its anomaly detection research. Due to the high dimension and large amount of satellite telemetry data, it is impossible to directly observe the period of the satellite telemetry data. The obtaining the error threshold through the period of the satellite telemetry data specifically includes:

obtaining satellite telemetry sample data in a satellite period from the database; and analyzing the satellite telemetry sample data based on the satellite telemetry sample data by using a wavelet variance, to determine an error threshold at each moment.

The specific process of analyzing the satellite telemetry sample data based on the satellite telemetry sample data by using a wavelet variance, to determine an error threshold at each moment is as follows:

(1) A wavelet function meets $\int_{-\infty}^{+\infty} \psi(t)dt = 0$.

A formula $$\psi_{a,b}(t) = |a|^{-1/2} \psi\left(\frac{t-b}{a}\right)$$

is used to determine a cluster of wavelet functions.

(2) A formula $$W_f(a, b) = |a|^{-1/2} \Delta t \sum_{k=1}^{N} f(k\Delta t) \overline{\psi}\left(\frac{k\Delta t - b}{a}\right)$$

is used to perform discrete transform on the wavelet function.

(3) A formula $$\text{Var}(a) = \frac{1}{N} \sum_{k=1}^{N} |W_f(a, b_k)|^2$$

is used to determine a wavelet variance.

A variance of the satellite telemetry data is determined based on the energy distribution of the satellite telemetry data fluctuation projected by the wavelet variance.

The satellite telemetry data in a period is analyzed based on the characteristics of satellite orbit operation. Data collected in a backward period window is counted to obtain a 97% upper quantile. Then the point is enlarged by $\alpha$ times, $U_i = y_i(1+\alpha)$ is used to determine an upper bound corresponding to the i-th input. $y_i$ is the 97% upper quantile in a backward period window of the i-th input data, and $\alpha$ is an undetermined scale factor.

In order to obtain an optimal dynamic threshold interval, recent historical data is taken to constitute a new prediction sample. This prediction sample is called a validation set. A dynamic threshold interval of the validation set is dynamically constructed by the time window.

Figure 3:
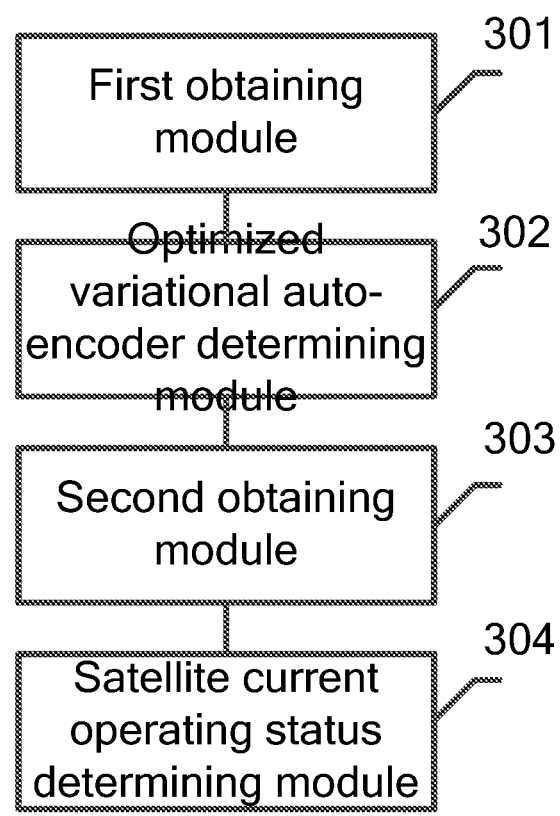
FIG. 3 is a schematic structural diagram of a satellite anomaly detection system for an adversarial network auto-encoder according to the present disclosure.

FIG. 3 is a schematic structural diagram of a satellite anomaly detection system for an adversarial network auto-encoder according to the present disclosure. As shown in FIG. 3, the satellite anomaly detection system for an adversarial network auto-encoder according to the present disclosure includes: a first obtaining module 301, an optimized variational auto-encoder determining module 302, a second obtaining module 303, and a satellite current operating status determining module 304.

The first obtaining module 301 is configured to obtain a variational auto-encoder and a generative adversarial network, where the variational auto-encoder takes satellite telemetry data as input and reconstructed data as output; the variational auto-encoder includes an encoder and a decoder; and the generative adversarial network includes a generator and a discriminator.

The optimized variational auto-encoder determining module 302 is configured to add the generative adversarial network to the variational auto-encoder, and determine an optimized variational auto-encoder, where the optimized variational auto-encoder includes an optimized encoder and the decoder; the optimized encoder is used to encode to-be-detected satellite telemetry data into a hidden variable; and the decoder is used to decode the hidden variable into the reconstructed data.

The second obtaining module 303 is configured to obtain the to-be-detected satellite telemetry data.

The satellite current operating status determining module 304 is configured to determine a current operating status of the satellite based on the to-be-detected satellite telemetry data by using the optimized variational auto-encoder, where the current operating status includes a normal operating state or an abnormal operating state.

The satellite current operating status determining module 304 specifically includes: a reconstructed data determining unit, a reconstruction error determining unit, an error threshold obtaining unit, a determining unit, a normal operating state determining unit, and an abnormal operating state determining unit.

The reconstructed data determining unit is configured to determine the reconstructed data based on the to-be-detected satellite telemetry data by using the optimized variational auto-encoder.

The reconstruction error determining unit is configured to determine a reconstruction error based on the to-be-detected satellite telemetry data, the reconstructed data, and the Mahalanobis distance.

The error threshold obtaining unit is configured to obtain an error threshold.

The determining unit is configured to determine whether the reconstruction error is less than the error threshold.

The normal operating state determining unit is configured to determine that a current operating status of the satellite is a normal operating state if the reconstruction error is less than the error threshold.

The abnormal operating state determining unit is configured to determine that the current operating status of the satellite is an abnormal operating state if the reconstruction error is not less than the error threshold.

The error threshold obtaining unit specifically includes: a satellite telemetry sample data obtaining subunit and an error threshold determining subunit.

The satellite telemetry sample data obtaining subunit is configured to obtain satellite telemetry sample data in a satellite period from a database.

The error threshold determining subunit is configured to analyze the satellite telemetry sample data based on the satellite telemetry sample data by using a wavelet variance, to determine an error threshold at each moment.

The optimized variational auto-encoder determining module 302 specifically includes: a generator determining unit, a discriminator determining unit, an optimized hidden variable determining unit, and an optimized variational auto-encoder determining unit.

The generator determining unit is configured to determine the generator of the generative adversarial network based on the encoder in the variational auto-encoder, where the generator is used to optimize the encoder in the variational auto-encoder and determine the optimized encoder.

The discriminator determining unit is configured to determine the discriminator of the generative adversarial network based on a bilateral long short-term memory network.

The optimized hidden variable determining unit is configured to discriminate the hidden variable encoded by the optimized encoder based on the discriminator, to determine an optimized hidden variable.

The optimized variational auto-encoder determining unit is configured to determine the optimized variational auto-encoder based on the optimized hidden variable and the decoder in the variational auto-encoder.

The above embodiments are provided merely for the purpose of describing the present disclosure and are not intended to limit the scope of the present disclosure. The scope of the present disclosure is defined by the appended claims. Various equivalent replacements and modifications made without departing from the spirit and scope of the present disclosure should fall within the scope of the present disclosure.

What is claimed is:

1. A satellite anomaly detection method for an adversarial network auto-encoder, comprising:
   obtaining a variational auto-encoder and a generative adversarial network, wherein the variational auto-encoder takes satellite telemetry data as input and reconstructed data as output; the variational auto-encoder comprises an encoder and a decoder; and the generative adversarial network comprises a generator and a discriminator;
   adding the generative adversarial network to the variational auto-encoder to determine an optimized variational auto-encoder, wherein the optimized variational auto-encoder comprises an optimized encoder and the decoder; the optimized encoder is used to encode to-be-detected satellite telemetry data into a hidden variable; and the decoder is used to decode the hidden variable into the reconstructed data, adding the generative adversarial network to the variational auto-encoder and determining an optimized variational auto-encoder comprises:
      determining the generator of the generative adversarial network based on the encoder in the variational auto-encoder, wherein the generator is used to optimize the encoder in the variational auto-encoder and determine the optimized encoder;
      determining the discriminator of the generative adversarial network based on a bilateral long short-term memory network;
      discriminating, based on the discriminator, the hidden variable encoded by the optimized encoder, to determine an optimized hidden variable; and
      determining the optimized variational auto-encoder based on the optimized hidden variable and the decoder in the variational auto-encoder;
   obtaining the to-be-detected satellite telemetry data; and
   determining a current operating status of a satellite based on the to-be-detected satellite telemetry data by using the optimized variational auto-encoder, wherein the current operating status comprises a normal operating state or an abnormal operating state.

2. The satellite anomaly detection method for an adversarial network auto-encoder according to claim 1, wherein the determining a current operating status of a satellite based on the to-be-detected satellite telemetry data by using the optimized variational auto-encoder specifically comprises:
   determining the reconstructed data based on the to-be-detected satellite telemetry data by using the optimized variational auto-encoder;
   determining a reconstruction error based on the to-be-detected satellite telemetry data, the reconstructed data, and a Mahalanobis distance;
   obtaining an error threshold;
   determining whether the reconstruction error is less than the error threshold;
   if the reconstruction error is less than the error threshold, determining that the current operating status of the satellite is the normal operating state; and
   if the reconstruction error is not less than the error threshold, determining that the current operating status of the satellite is the abnormal operating state.

3. The satellite anomaly detection method for an adversarial network auto-encoder according to claim 2, wherein the obtaining an error threshold specifically comprises:
   obtaining satellite telemetry sample data in a satellite period from a database; and
   analyzing the satellite telemetry sample data based on the satellite telemetry sample data by using a wavelet variance, to determine an error threshold at each moment.

* * * * *